United States Patent
Jaic et al.

(10) Patent No.: US 12,023,548 B2
(45) Date of Patent: Jul. 2, 2024

(54) LEADERBOARD SYSTEMS AND METHODS FOR EXERCISE EQUIPMENT

(71) Applicant: Peloton Interactive, Inc., New York, NY (US)

(72) Inventors: Keerthan Jaic, London (GB); Jay Patel, Bloomfield, NJ (US); Masha Schneider, Guttenberg, NJ (US); Alexey Zankevich, Fort Lee, NJ (US)

(73) Assignee: Peloton Interactive, Inc., New York, NY (US)

( * ) Notice: Subject to any disclaimer, the term of this patent is extended or adjusted under 35 U.S.C. 154(b) by 143 days.

(21) Appl. No.: 17/543,704

(22) Filed: Dec. 6, 2021

(65) Prior Publication Data

US 2022/0088440 A1    Mar. 24, 2022

Related U.S. Application Data

(63) Continuation of application No. PCT/US2020/042206, filed on Jul. 15, 2020.

(60) Provisional application No. 62/954,353, filed on Dec. 27, 2019, provisional application No. 62/881,337, filed on Jul. 31, 2019.

(51) Int. Cl.
*A63B 24/00* (2006.01)
*A63B 22/06* (2006.01)
*A63B 71/06* (2006.01)

(52) U.S. Cl.
CPC ...... *A63B 24/0084* (2013.01); *A63B 22/0605* (2013.01); *A63B 71/0622* (2013.01); *A63B 2024/0068* (2013.01); *A63B 2024/0081* (2013.01); *A63B 2071/0625* (2013.01); *A63B 2071/0638* (2013.01); *A63B 2225/20* (2013.01)

(58) Field of Classification Search
CPC .............. A63B 24/0084; G09B 19/003; G09B 19/0038
See application file for complete search history.

(56) References Cited

U.S. PATENT DOCUMENTS

| | | | | |
|---|---|---|---|---|
| 2005/0106543 | A1* | 5/2005 | Day | A63B 69/36 434/365 |
| 2009/0118100 | A1* | 5/2009 | Oliver | A63B 24/0062 482/8 |

(Continued)

*Primary Examiner* — Peter R Egloff
(74) *Attorney, Agent, or Firm* — Haynes and Boone, LLP

(57) ABSTRACT

On-demand data is provided for real-time exercise experience including identifying available classes, receiving exercise class selection, retrieving associated leaderboard data, decompressing leaderboard data, and delivering exercise class content including leaderboard data to an exercise apparatus. Systems and methods further include receiving a class end condition, gathering data from the selected exercise class, compressing the gathered data, and appending the compressed data to stored leaderboard data. Compressing includes sampling a points from each user's workout through a recursive process including identifying a first point, last point and at least one mid-point of the workout, and for each successive pair of sampled points, identifying a mid-point that is furthest away from a line segment between the pair of sampled points, and adding the mid-point to the plurality of points if a distance between the mid-point and the line segment is greater than a predetermined threshold.

20 Claims, 14 Drawing Sheets

(56) References Cited

U.S. PATENT DOCUMENTS

| | | | |
|---|---|---|---|
| 2012/0029666 A1* | 2/2012 | Crowley | A63B 69/002 700/91 |
| 2014/0038781 A1 | 2/2014 | Foley et al. | |
| 2014/0122494 A1* | 5/2014 | Thurston | G06F 16/24578 707/738 |
| 2014/0213372 A1* | 7/2014 | Liang | A63F 13/2145 463/43 |
| 2015/0106052 A1* | 4/2015 | Balakrishnan | A61B 5/6823 702/150 |
| 2016/0089574 A1 | 3/2016 | Henning et al. | |
| 2016/0121165 A1* | 5/2016 | Foley | A63B 71/0622 482/9 |
| 2017/0249402 A1* | 8/2017 | Liu | G06F 30/20 |
| 2018/0015345 A1* | 1/2018 | Wrigg | A63B 24/0062 |
| 2018/0056132 A1 | 3/2018 | Foley et al. | |

* cited by examiner

10

```
┌─────────────────────────────────────────────────┐
│ On workout finalization, load exercise data to  │
│ leaderboard system  12                          │
└─────────────────────────────────────────────────┘
                        │
                        ▼
┌─────────────────────────────────────────────────┐
│ Run compression algorithm to sample data for    │
│ workout 14                                      │
└─────────────────────────────────────────────────┘
                        │
                        ▼
┌─────────────────────────────────────────────────┐
│ Store compressed workout data for the exercise  │
│ class (e.g., append to existing data for the    │
│ exercise class) 16                              │
└─────────────────────────────────────────────────┘
                        │
                        ▼
┌─────────────────────────────────────────────────┐
│ Receive request to start new exercise class and │
│ load compressed leaderboard data from the class │
│ 18                                              │
└─────────────────────────────────────────────────┘
                        │
                        ▼
┌─────────────────────────────────────────────────┐
│ Decompress leaderboard data to recreate         │
│ leaderboard data for the exercise class 20      │
└─────────────────────────────────────────────────┘
                        │
                        ▼
┌─────────────────────────────────────────────────┐
│ Deliver leaderboard content to exercise content │
│ server and/or user apparatus 22                 │
└─────────────────────────────────────────────────┘
```

FIG. 1

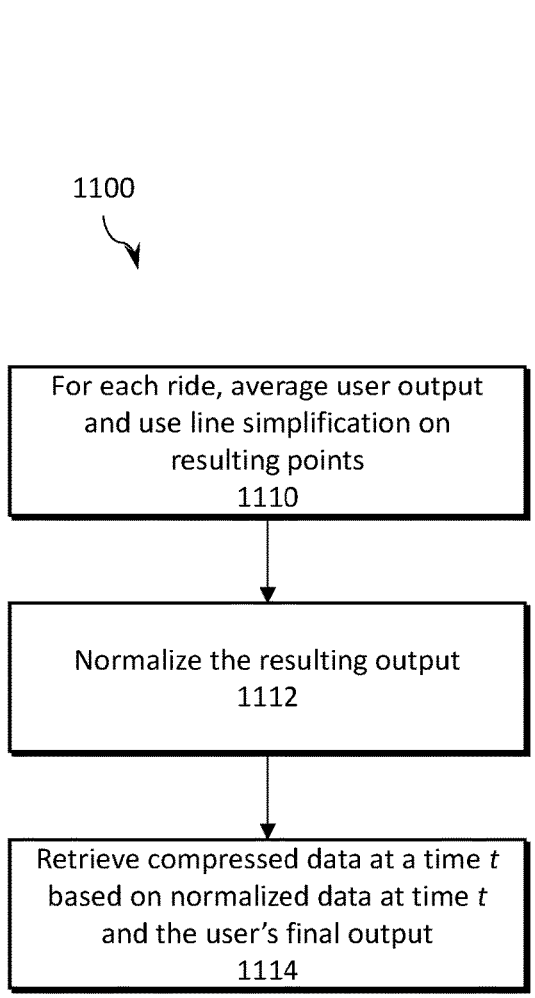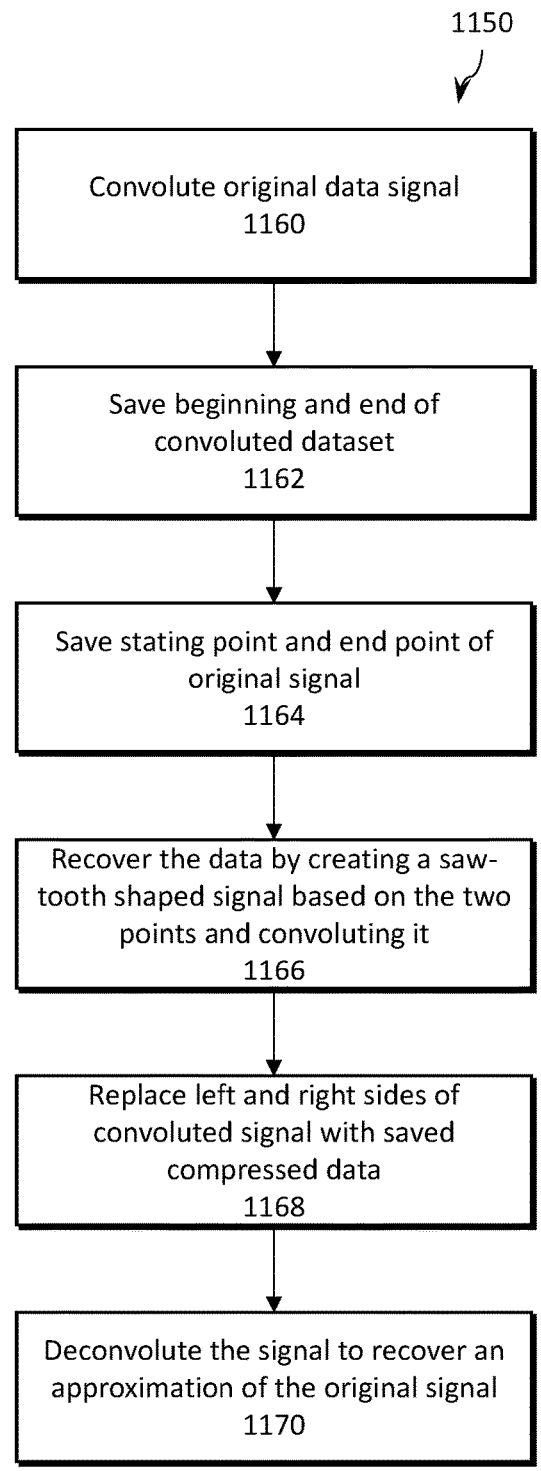
FIG. 11A
FIG. 11B

LEADERBOARD SYSTEMS AND METHODS FOR EXERCISE EQUIPMENT

CROSS-REFERENCE TO RELATED APPLICATIONS

This application is a continuation of U.S. International Application No. PCT/US2020/042206 filed Jul. 15, 2020, titled "LEADERBOARD SYSTEMS AND METHODS FOR EXERCISE EQUIPMENT" which claims the benefit of and priority to U.S. Provisional Patent Application No. 62/881,337, filed Jul. 31, 2019, titled "LEADERBOARD SYSTEMS AND METHODS FOR EXERCISE EQUIPMENT," and U.S. Provisional Patent Application No. 62/954,353, filed Dec. 27, 2019, titled "LEADERBOARD SYSTEMS AND METHODS FOR EXERCISE EQUIPMENT" all of which are incorporated herein by reference in their entirety

TECHNICAL FIELD

The present application relates generally to the field of exercise equipment and methods, and more specifically, for example, to systems and methods for providing live streaming and/or on-demand exercise content including leaderboards.

BACKGROUND

Humans are competitive by nature, striving to improve their performance both as compared to their own prior efforts and as compared to others. Humans are also drawn to games and other diversions, such that even tasks that a person may find difficult or annoying can become appealing if different gaming elements are introduced. Existing home and gym-based exercise systems and methods frequently lack key features that allow participants to effectively compete with each other and/or that gamify exercise activities.

To improve the exercise experience and provide a more engaging environment, gyms offer classes such as cycling classes where the instructor and participants exercise on stationary bikes accompanied by music. The instructor, music and other class participants combine to motivate participants to work harder and maintain better pedal cadence or tempo. More recently, boutique cycling studios have taken the cycling class concept to dedicated spaces to create even more powerful class experiences. These gym and boutique classes are typically accessible only at specific times and locations and may be unavailable and expensive for many potential users.

One solution is to provide a stationary bike or other exercise apparatus that incorporates multimedia inputs and outputs for live streaming or archived instructional content, socially networked audio and video chat, networked performance metrics and competition capabilities, along with a range of gamification features. For example, U.S. Pat. No. 10,322,315, filed Jul. 16, 2018, titled "Exercise System and Method," which is incorporated herein by reference in its entirety, discloses a stationary bike local system that is configured to display a leaderboard to allow the user to see their performance in comparison to others taking the same live online or archived class.

As the user base for such exercise systems grows, there is a need to scale a large volume of user, class and performance data, including leaderboard data, while preserving the current user experience, which includes on-demand, online, and/or real-time interactions during an exercise class. The need of the system to provide on demand and real time access to a large volume of archived data while providing the user with a simulated live experience poses numerous challenges. In view of the foregoing, there is a continued need in the art for improved systems and methods for delivering leaderboard and other exercise content to users of exercise equipment.

SUMMARY

The present disclosure includes improved systems and methods for compiling, storing and delivering leaderboard content for exercise equipment. The present disclosure addresses a need for scalable systems and methods for providing a large volume of on-demand leaderboard data, while preserving the user experience of a large and/or growing user base. In various embodiments, the system compresses workout data for a live and/or archived class and reconstructs a global leaderboard when serving content. The systems and methods disclosed herein provide many advantages over convention systems and methods, including reduced storage space, reduced network overhead and ability to scale horizontally.

The scope of the present disclosure is defined by the claims, which are incorporated into this section by reference. A more complete understanding of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

FIG. 1 illustrates an example method for operating a leaderboard system, in accordance with one or more embodiments of the present disclosure.

FIGS. 11A, 11B and 11C are flow diagrams illustrating example compression approaches for the storage and retrieval of computer generated media content, in accordance with one or more embodiments of the present disclosure.

DETAILED DESCRIPTION

Figure 2:
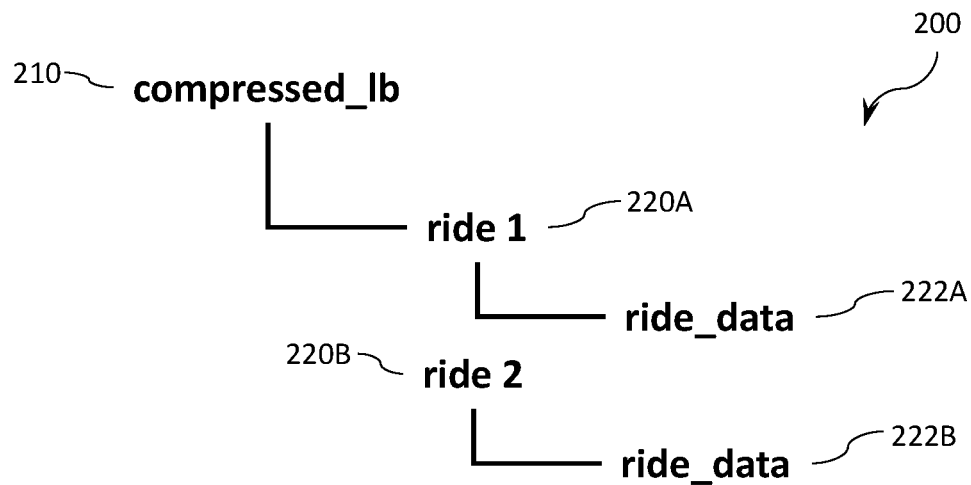
FIG. 2 illustrates an example file organization for storing leaderboard data, in accordance with one or more embodiments of the present disclosure.

In various embodiments of the present disclosure, improved systems and methods for compiling, storing and delivering leaderboard content for exercise equipment are provided. The present disclosure addresses a need for scalable systems and methods for providing a large volume of on-demand leaderboard data, while preserving the user experience of a large and/or growing user base. In various embodiments, the system compresses workout data for a live and/or archived class and reconstructs a global leaderboard when serving content. The systems and methods disclosed herein provide many advantages over convention systems and methods, including reduced storage space, reduced network overhead and ability to scale horizontally.

The growing popularity of live and archived exercise classes has led to increased demands on content server systems and data storage and retrieval systems to meet the real-time requirements of class participants. For example, a widely adopted exercise class content storage and delivery system may receive requests, on average, to produce leaderboard content for 5,000 to over 50,000 users at a time. The system may receive and process a plurality of data points associated with each class and each class participant. The average ride in such systems could consume large amounts of storage space (e.g., over 10 megabytes of data) and larger rides may consume over 70 megabytes of storage in various systems. In some systems, a leaderboard delivery system may be designed to meet one or more performance goals including delivering over 50 new workouts per second with peak demand of over 150 workouts per second and being able to quickly load 1 GB or more of leaderboard information for the workouts. It is anticipated that the number of participants, the amount of data stored, and amount of content processed and delivered may increase beyond these requirements as systems continue to grow to accommodate more users and facilitate more features.

Various embodiments of an example leaderboard system will now be described with reference to the figures. Referring to FIG. 1, a method 10 for operating a leaderboard system may be performed by one or more processing systems, such as one or more network servers or cloud application and storage servers. In some embodiments, one or more content servers are configured to facilitate live and/or on-demand exercise classes for users of an exercise apparatus. Exercise data may be processed for every workout (or a subset thereof), which may include uploading exercise data during or after each workout. In the illustrated embodiment, on workout finalization, such as the end of an exercise class, every packet or selected packets of data for a workout are uploaded to a leaderboard system (step 12).

Next, the leaderboard system executes a compression algorithm to sample data points to reduce the data needed to recreate the workout later (step 14). The compressed workout data is then stored in a leaderboard storage (e.g., cloud storage, networked database storage, etc.) accessible to the leaderboard system (step 16). This may include creating a new leaderboard file for the exercise class, appending the compressed workout data to existing data for the exercise class, or other storage process.

When a user of an exercise apparatus starts a new on-demand exercise class, the data previously stored in the leaderboard storage system is identified and read from the leaderboard storage (step 18). The sampled data points are used to decompress the leaderboard to recreate a representation of the full leaderboard (step 20). The decompressed leaderboard content will then be provided to the content server serving media associated with the on-demand exercise class to the exercise apparatus and/or to another system or device associated with the exercise class. For example, in some embodiments the user of an exercise apparatus may access exercise content through a networked device such as a mobile phone, tablet, television, computer or other system that receives, displays and/or plays back the media associated with the on-demand exercise class.

In some embodiments, the compression uses a lossy compression algorithm, such as the Ramer-Douglas-Peucker algorithm ("Douglas-Peucker algorithm"), to sample key points from each user's workout. In some embodiments, the compression algorithm starts with the first and last points of the workout and finds a point that is furthest away from the line segment between the first and last point. If the point is closer than a predetermined threshold to the line segment, then any points not currently marked to be kept can be discarded without the simplified curve being worse than the threshold. If the point furthest from the line segment is greater than the threshold away from the line segment, then the point is kept. The algorithm then recursively calls itself with each line segment between the points until no new points are added. When recursion is complete, a new data set defining the workout is generated including the points that have been marked as kept and stored in a leaderboard storage.

When a request is received for an on-demand workout, the leaderboard system retrieves the compressed data and the compression algorithm can interpolate those points to recreate the selected workout. Depending on the threshold used during compression, the system can control maximum error to according to system specifications and constraints. In test environments, with a threshold of 1 (defined as 1 joule) setting the maximal error at any given point, a compression rate of 95% was achieved.

In some embodiments, the leaderboard system is configured to generate two compressed sets of data for a workout. The first dataset includes times for each class participant. The second dataset includes outputs corresponding to those times. Both lists may be stored (e.g., in plain text, in a database, etc.) in a file that includes a workout identifier and compressed data including associated times and outputs.

In some embodiments, the server and storage system are configured to store one file per ride. An advantage of this approach is that the system will be able to retrieve over 5,000 concurrent requests per ride at the speed of the network interface. One disadvantage of this approach is that updating these files may require extra logic and programming in a system in which server objects are immutable. In some embodiments, the server and storage system include a cloud storage system and/or cloud application server.

An example file system 200 for used with a cloud storage system is illustrated in FIG. 2. The file system 200 may include a folder 210 for a compressed leaderboard data for an exercise class, and a prefix or "folder" per ride (e.g., ride1 220A and ride2 220B) with one file in each folder (e.g., ride_data 222A and ride_data 222B, respectively) which would have compressed data from the corresponding ride. In some embodiments, the ride prefix may be unnecessary, while in other embodiments the ride prefix may be used for certain cloud storage systems (e.g., S3) which guarantee a certain requests-per-second (RPS) performance on a prefix level. The folder 210 may include an exercise class identifier allowing the folder for a class to be readily identified.

Figure 3:
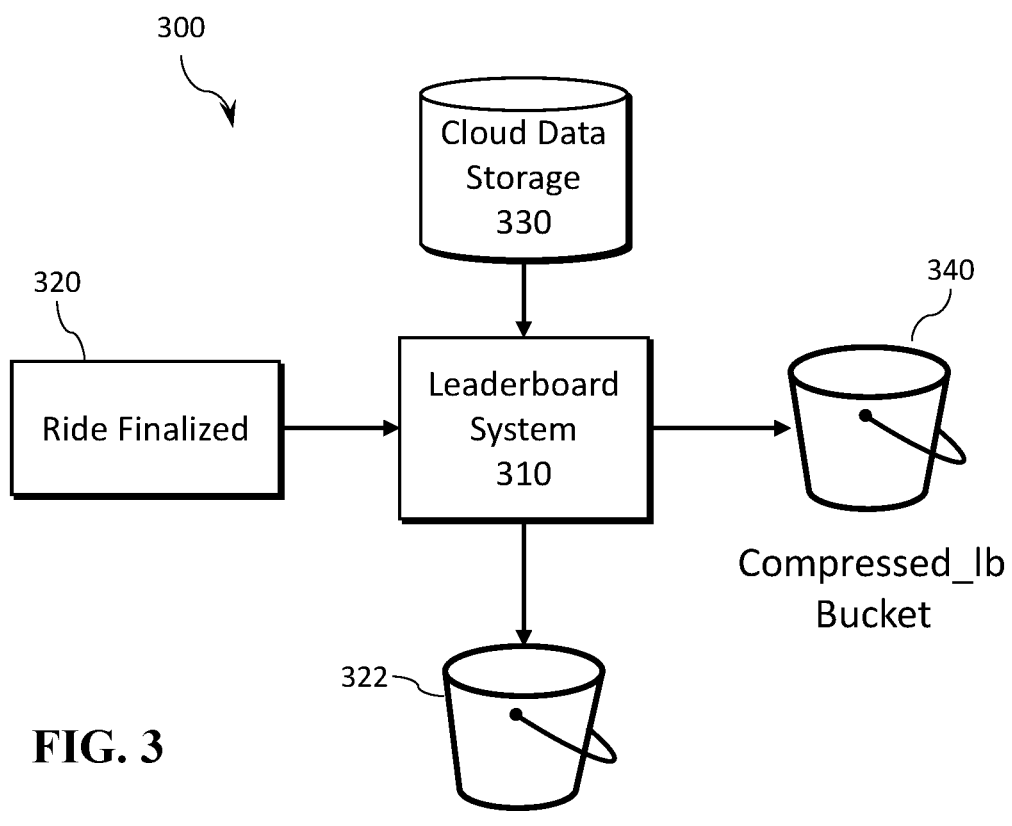
FIG. 3 illustrates an example system for generating an initial ride file, in accordance with one or more embodiments of the present disclosure.

The generation of the initial ride file will now be described with reference to FIG. 3. An exercise content storage and delivery system 300 serves media content for a live or on-demand ride and captures and stores workout data. When a ride is finalized (e.g., when a live ride ends and an "End Workout" Segment control button, for example, is pushed) a component 320 of the exercise content storage and delivery system 300 creates a ride identifier that be added to a queue of workouts 322 for processing. The generation of a ride identifier may be followed by a function initiated by the leaderboard system 310 to request leaderboard workout data from all of the user workout devices for the class. In some embodiments, multiple riders may participate in a class from various remote locations, and the leaderboard system 310 requests workout data associated with a corresponding exercise apparatus for each user/location. In some embodiments, the workout data is automatically uploaded by the local workout devices at the end of a workout session.

In various embodiments, the leaderboard system 310 may be implemented through a network server, cloud application server, an event-driven, serverless computing platform (e.g., AWS Lambda) providing web services or other computing environment. The system will load available workout data (e.g., received packets from an exercise device or cloud storage system) and any missing packets from other online storage systems (e.g., cloud storage 330) associated with the ride, to generate the compressed leaderboard 340. The compressed leaderboard may be stored to a cloud storage system in the compression format described above for subsequent retrieval of an on-demand exercise class. In some embodiments, the cloud storage 330 includes a relational or non-relational database (e.g., DynamoDB).

In some embodiments, the leaderboard system includes special logic allowing leaderboard data to be appended through using the file structure previously described. All rides may be added to a master ride file on the cloud storage, so that on-demand workouts appear in future leaderboards. By using an append operation, only the data appended will get uploaded, thereby saving on network bandwidth usage, processing and costs. Other system structures may also be used, but many have constraints that include databases (difficult to meet needed QPS) and EFS (too costly in view of expected throughput and high variance in latency) which would could negatively affect user experience.

Figure 4:
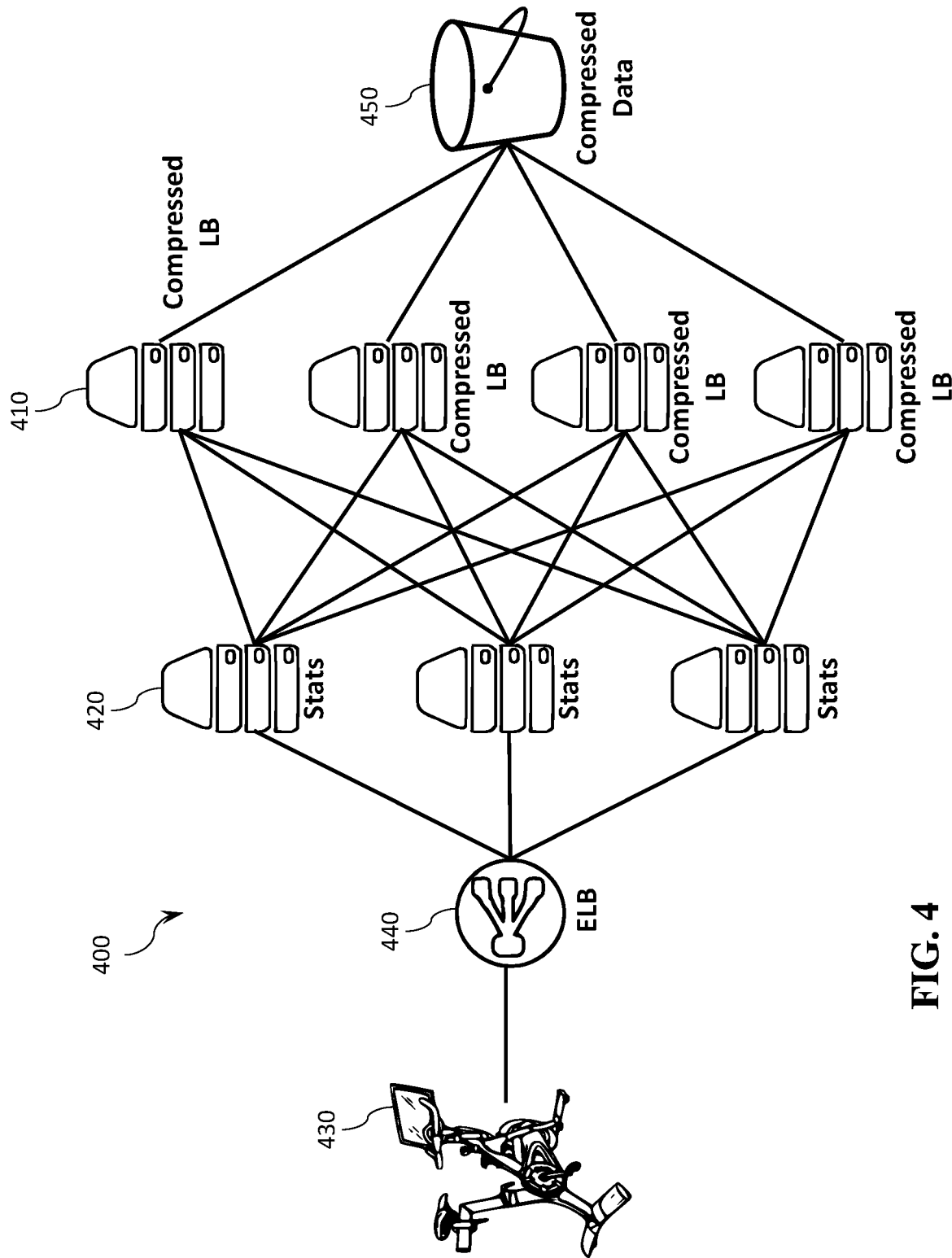
FIG. 4 illustrates a first example leaderboard system for generating, compressing and storing leaderboard data, in accordance with one or more embodiments of the present disclosure.

An embodiment of a system 400 for implementing a leaderboard server is illustrated in FIG. 4. The system 400 includes a plurality of servers, processing devices, routing devices, and storage devices in a networked arrangement. A server is the component that will read the compressed data from storage (e.g., cloud storage) and recreate the leaderboard. Compressed leaderboard servers 410 are configured to execute leaderboard compression and server logic. The compressed leaderboard servers 410 receive requests from one or more statistics servers 420 that may include adding a user to a leaderboard, returning the full leaderboard, and other related commands.

When the system 400 gets receives a request to start a workout (e.g., an exercise class having a ride identifier), an associated request for leaderboard information is passed to a compressed leaderboard server 410, which is configured to find the correct file for the ride identifier from a workout database of compressed data 450. The compressed leaderboard server 410 then loads the full leaderboard from the stored compressed data 450. At this point the leaderboard may be embodied as a compressed list of lists. The compressed leaderboard server 410 then processes these lists to create a list of functions (e.g., polynomial functions) which can be called with a timestamp to return an output for that timestamp (e.g., using a linear interpolator library). For "add" requests, the compressed leaderboard server 410 compresses and stores the user's latest output received from an exercise apparatus 430. On subsequent "get" requests, the leaderboard server may loop over the list and recreate a full leaderboard for the user which it will then include the user output stored above.

To facilitate efficient processing, the system 400, in some embodiments, is configured to efficiently route (e.g., via elastic load balancing routers 440) a given workout to the same server. For example, this can be accomplished by sharding on workout ids in the stats server 420. In the event of a server crash, the leaderboard can be served from any server, with an adjustment of the routing. Some latency may be experienced during the switchover because the new server will reread the leaderboard from the cloud storage system.

Figure 5:
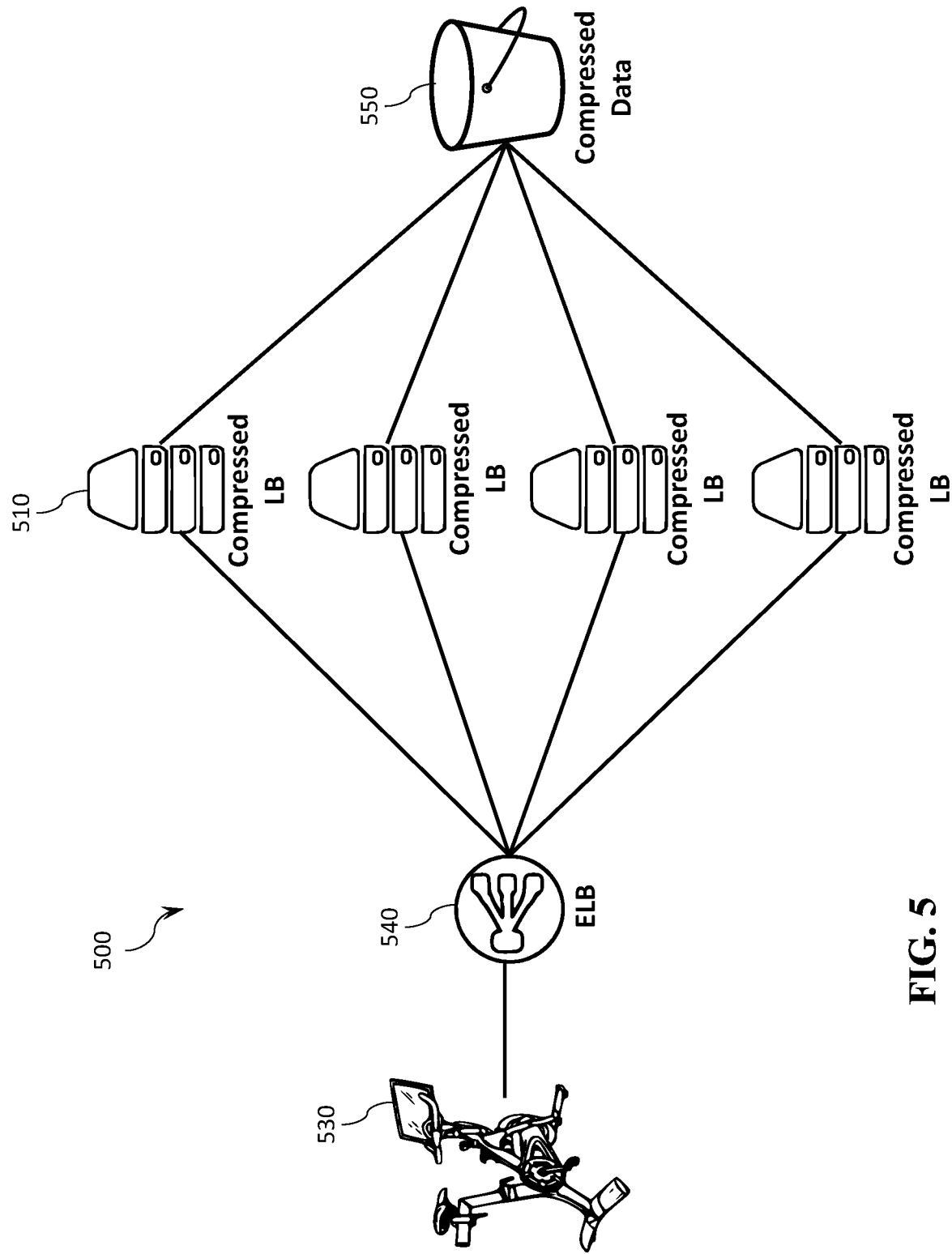
FIG. 5 illustrates a second example leaderboard system for generating, compressing and storing leaderboard data, in accordance with one or more embodiments of the present disclosure.

Another embodiment of a system 500 for implementing a leaderboard server is illustrated in FIG. 5. One goal of this embodiment is to route (e.g., via elastic load balancing routers 540) on-demand leaderboard requests from an exercise apparatus 530 directly to the compressed leaderboard server 510, which interfaces with the compressed data storage system 550. In order to accomplish this, the compressed leaderboard server 510 includes logic to facilitate sorting, filtering and windowing the data. Without a statistics server doing the routing, the ELB layer 540 is configured to handle the routing using sticky sessions.

The logic for implementing the compressed leaderboard services may be written in Kotlin, Python or other suitable programming language for execution by a processor. In some embodiments, Kotlin would reduce the complexity of the service as compared to Python. The system may be programmed to have several independent processes, one per core. There are several considerations to be addressed with this, two of which are lack of shared memory and routing complexity. In some embodiments, with a remote procedural call layer between the client process and the leaderboard processes, in order to have balanced load distribution every client would be connected to every single process running which would multiply with the number of cores. This system may also need every request for the same workout to go to the same process because there is a cost to loading the compressed leaderboard or to share memory between them with a third-party piece of software (e.g., a distributed memory caching system), which is not as efficient as storing every request in random access memory or other fast access memory in a lock free data structure. The system may lose the ability for workouts to share decompressed through an in-process memory structure. Then the networking complexity would grow with the number of cores.

In other embodiments, Python processes may be used, which may affect efficiency. With the leaderboard data stored for a workout consistently in one process standard Python libraries pose issues because they may close processes after finishing running tasks and respawn new ones for new tasks. To achieve a goal of generating a new leaderboard every 2 seconds or better, the system may either have to reallocate a new array every time or store the previous second's leaderboard, but that would be copied into the new process's memory space when spawned. Either way the process would either be doing a lot of copying or a lot of allocating.

In some embodiments, a programming language such as Kotlin, which is written over the Java Virtual Machine and has native multithreading built in, may be used. Kotlin can avoid certain work-arounds to a global interpreter lock or spawning processes with a copy on write memory model. Kotlin allows the system to have a shared object for the decompressed leaderboard for a ride. The system would then be able to generate second by second leaderboards on a per workout basis in different threads without having multiple copies of the core leaderboard from the cloud. The system would also be able to store sorted leaderboards from previous requests and then generate new ones based on the previous seconds ordering. Because users don't move that much the system will be creating mostly sorted leaderboards in place, completely avoiding copying and optimizing the subsequent sort because the data will be close to sorted because people don't tend to move around too much every second.

Example Leaderboard Implementations For Exercise Apparatus

Figure 6:
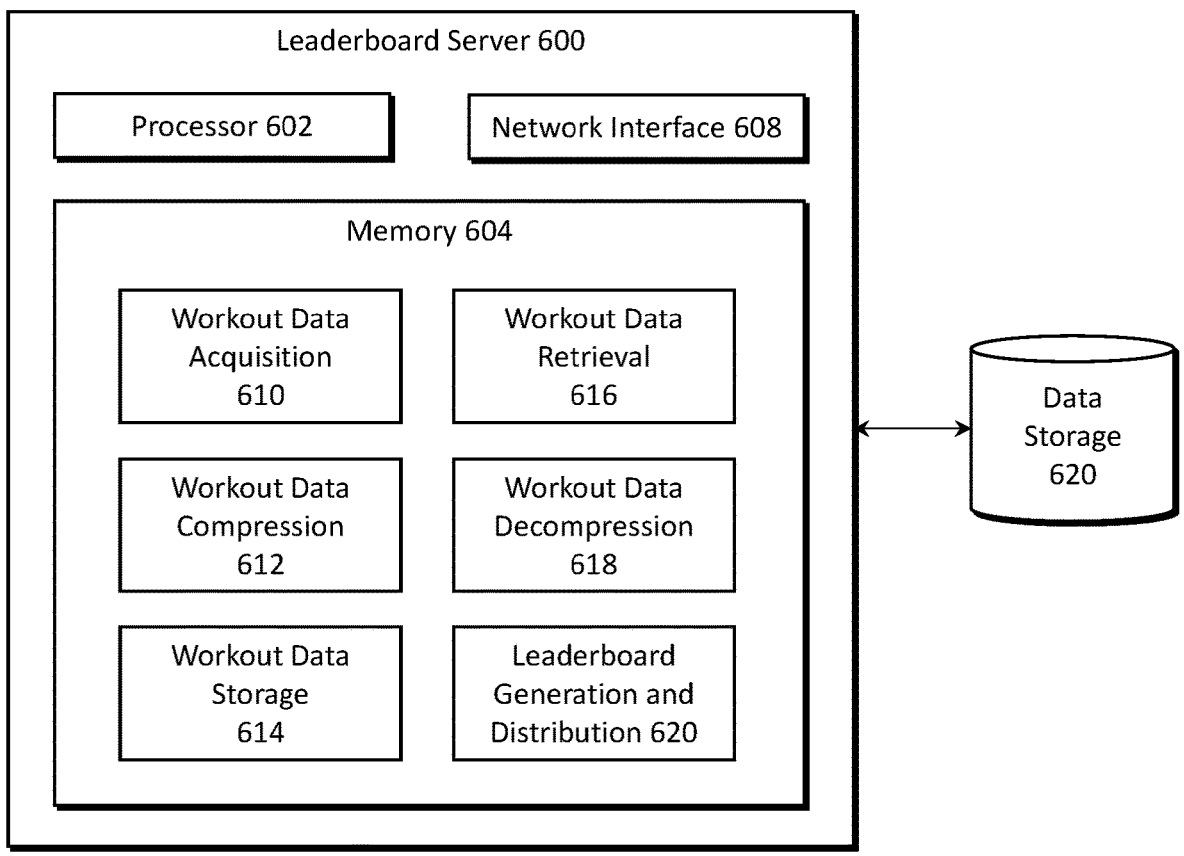
FIG. 6 is an example leaderboard server system, in accordance with one or more embodiments of the present disclosure.

The systems and methods disclosed herein can be embodied in a server environment that operates via the Internet or another network such as a wireless network. An example leaderboard server 600, in accordance with one or more embodiments of the present disclosure is illustrated in FIG. 6. The leaderboard server 600 may include one or more processors 602, memories 604, network interfaces 608, and a data storage 620 (e.g., cloud storage, networked storage, etc.). The processor 602, may include any suitable processing component or logic device such as a central processing unit, a multi-purpose processor, a microprocessor, a special purpose processor, etc. The memory 604 may include one or more volatile, non-volatile, and/or replaceable storage components, such as magnetic, flash, optical or other storage components. The memory 604 may store computer-readable instructions and logic stored 604 for execution by the processor 602, including various logical components and processes as disclosed herein. In some the embodiments, the leaderboard server 600 includes software modules configured to facilitate workout data acquisition 610, workout data compression 612. workout data storage 614, workout data retrieval 616, workout data decompression 618, leaderboard generation and distribution 620. The network interface 608 is configured to facilitate communications between the leaderboard server 600 and other systems or devices via a communications network that may include wired (e.g., Ethernet). wireless (e.g., cellular, WI-FI), and/or other networking types configured for efficient data transfer communications.

Figure 7A:
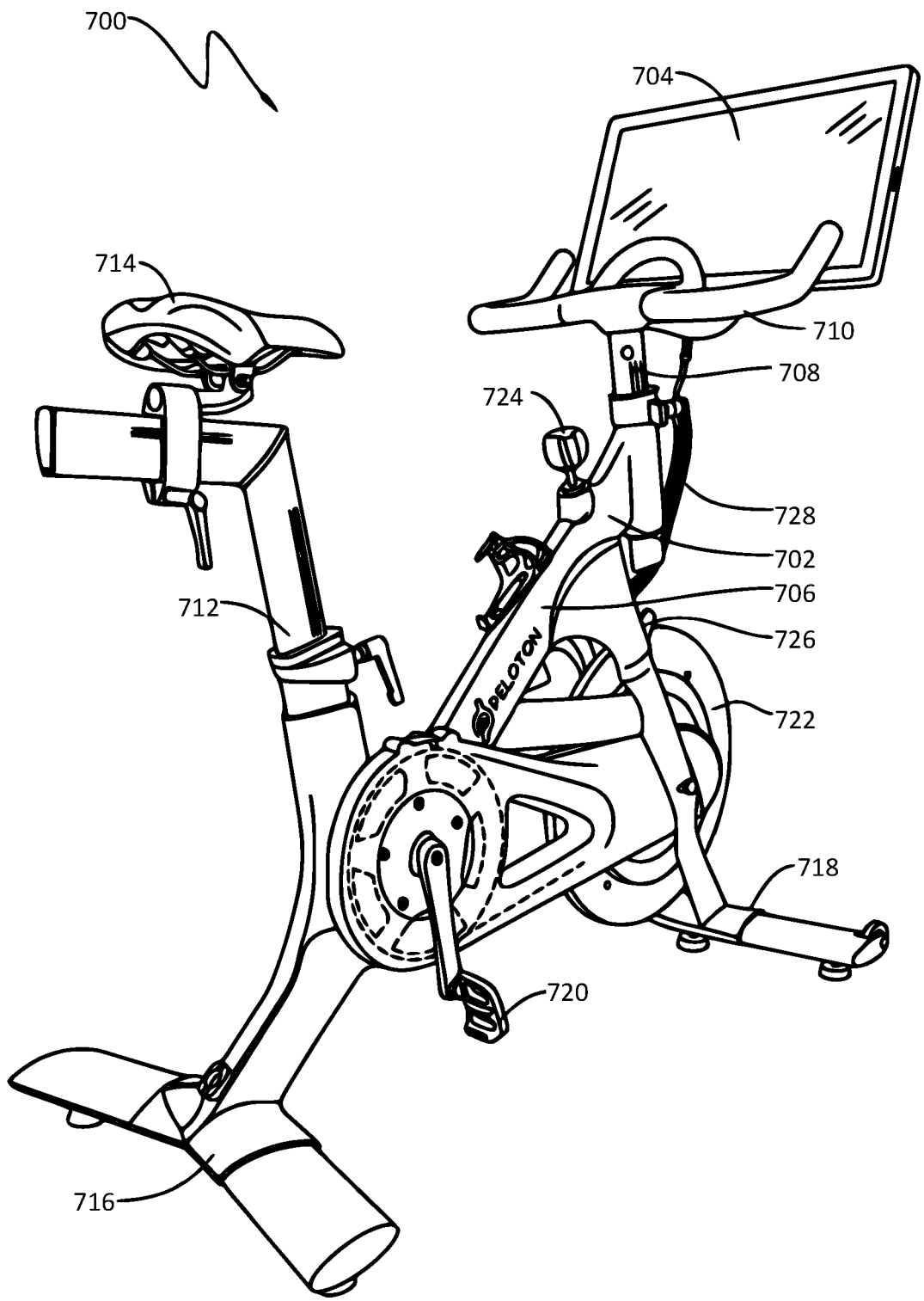
FIGS. 7A and 7B are rear perspective views of an example exercise apparatus, in accordance with one or more embodiments the present disclosure.
Figure 7B:
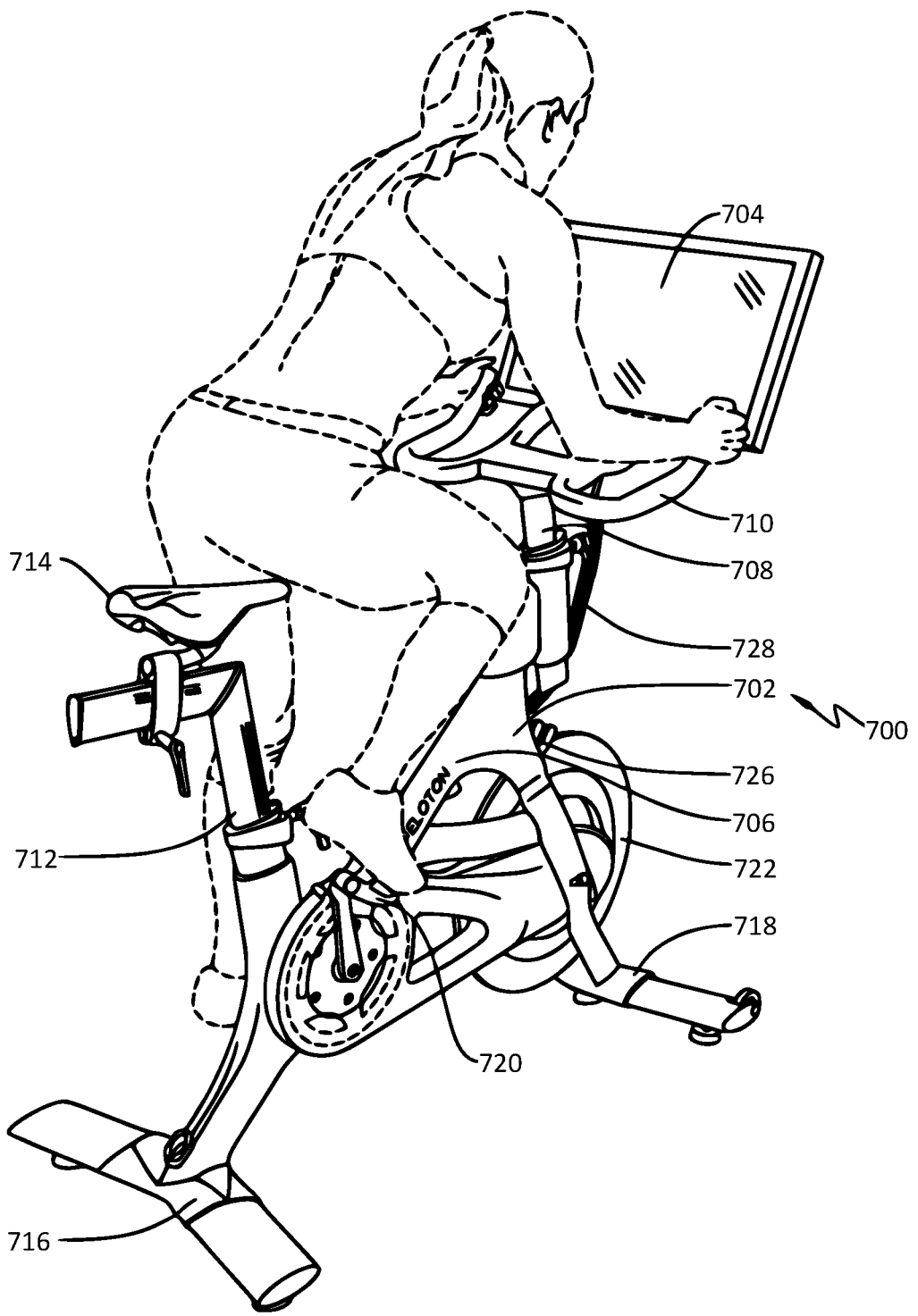

Referring generally to FIGS. 7A and 7B, various embodiments of an exercise apparatus will now be described. Although the embodiments illustrate an example with a stationary bike, exercise classes and other exercise related content, it will be appreciated that the present disclosure is not limited to cycling and may be implemented with other exercise equipment and/or other content creation and delivery applications.

In various embodiments, local system 700 comprises a stationary bike 702 with integrated or communicably connected digital hardware including at least one display screen 704. The stationary bike 702 may comprise a frame 706, a handlebar post 708 to support the handlebars 710, a seat post 712 to support the seat 714, a rear support 716 and a front support 718. Pedals 720 are used to drive a wheel 722 via a belt, chain, or other drive mechanism. The wheel 722 may be a heavy metal disc or other appropriate mechanism. In various example embodiments, the force on the pedals necessary to spin the wheel 722 can be adjusted using a resistance adjustment knob 724. The resistance adjustment knob or other resistance adjustment components may directly or indirectly control a device that increases or decreases the resistance of the wheel to rotation. For example, rotating the resistance adjustment knob clockwise may cause a set of magnets 726 to move relative to the wheel, increasing its resistance to rotation and increasing the force that the user must apply to the pedals to make the wheel spin.

The stationary bike 702 may also include various features that allow for adjustment of the position of the seat 714, handlebars 710, etc. In various example embodiments, the display screen 704 may be mounted in front of the user, forward of the handlebars. Such display screen may include a hinge or other mechanism to allow for adjustment of the position or orientation of the display screen relative to the rider. In some embodiments, the display screen may be implemented in a tablet, mobile phone, portable computer, television or other device communicably connected to one or more components of the stationary bike 702.

The digital hardware associated with the stationary bike 702 may be connected to or integrated with the stationary bike 702, or it may be located remotely and wirelessly connected to the stationary bike. The display screen 704 may be attached to the stationary bike or it may be mounted separately but should be positioned to be in the line of sight of a person using the stationary bike. The digital hardware may include digital storage, processing, and communications hardware, software, and/or one or more media input/output devices such as display screens, cameras, microphones, keyboards, touchscreens, headsets, and/or audio speakers. In various example embodiments these components may be integrated with the stationary bike. All communications between and among such components may be multichannel, multi-directional, and wireless or wired (e.g., using a wire 728), using any appropriate protocol or technology. In various example embodiments, the system may include associated mobile and web-based application programs that provide access to account, performance, and other relevant information to users from local or remote personal computers, laptops, mobile devices, or any other digital device.

In various example embodiments, the stationary bike 702 may be equipped with various sensors that can measure a range of performance metrics from both the stationary bike and the rider, instantaneously and/or over time. For example, the stationary bike may include power measurement sensors such as magnetic resistance power measurement sensors or an eddy current power monitoring system that provides continuous power measurement during use. The stationary bike may also include a wide range of other sensors to measure speed, pedal cadence, wheel rotational speed, etc.

The stationary bike may also include sensors to measure rider heart-rate, respiration, hydration, or any other physical characteristic. Such sensors may communicate with storage and processing systems on the bike, nearby, or at a remote location, using wired or wireless connections.

Hardware and software within the sensors or in a separate package may be provided to calculate and store a wide range of performance information. Relevant performance metrics that may be measured or calculated include distance, speed, resistance, power, total work, pedal cadence, heart rate, respiration, hydration, calorie burn, and/or any custom performance scores that may be developed. Where appropriate, such performance metrics can be calculated as current/instantaneous values, maximum, minimum, average, or total over time, or using any other statistical analysis. Trends can also be determined, stored, and displayed to the user, the instructor, and/or other users. A user interface may provide for the user to control the language, units, and other characteristics for the various information displayed.

In various example embodiments the stationary bike 702 may be equipped with one or more large display screens (e.g., display screen 704), cameras, microphones, and speakers or other audio outputs. The display screen 704 may be mounted directly to the stationary bike 702 or otherwise placed within the viewing area of the user. In various example embodiments, at least one display screen is integrated into or attached to the stationary bike and is positioned in front of the rider generally centered on the handlebars 710 of the stationary bike as illustrated in the figures. Various mechanisms can be used to allow the user to customize the position of the display screen(s).

In an example embodiment, a display screen 704 may be attached to the stationary bike 702 via a curved structure extending up and forward from the front stem of the frame 706. The curved structure may include a slot or aperture through it and extending along a portion of the length of the curved structure. A mounting post or similar structure on the display screen may attach to the curved structure, such as by a pin that passes through the mounting post or structure and the curved structure. In an example embodiment, the pin may have a mechanism such as threads that allow it to be tightened to hold and lock the mounting post or structure at a particular location and position.

Display screen 704 may be driven by a user input device such as a touchscreen, mouse, or other device. In various example embodiments a touchscreen display is mounted on the stationary bike generally centered between the handlebars and located just below the handlebars. The display screen may be any size, but optimally is large enough and oriented to allow the display of a range of information including one or more video streams, a range of performance metrics for the user and others, and a range of different controls.

In various example embodiments the user can use a touchscreen or other interface to selectively present a range of different information on the screen including live and/or archived video, performance data, and other user and system information. The user interface can provide a wide range of control and informational windows that can be accessed and removed individually and/or as a group by a click, touch, or gesture. In various example embodiments, such windows may provide information about the user's own performance and/or the performance of other participants in the same class both past and present.

The user interface can be used to access member information, login and logout of the system, access live content such as live exercise classes and archived content (referred to in the Figures as "Rides on Demand"). User information may be displayed in a variety of formats and may include historical and current performance and account information, social networking links and information, achievements, etc. The user interface can also be used to access the system to update profile or member information, manage account settings such as information sharing, and control device settings.

Figure 8A:
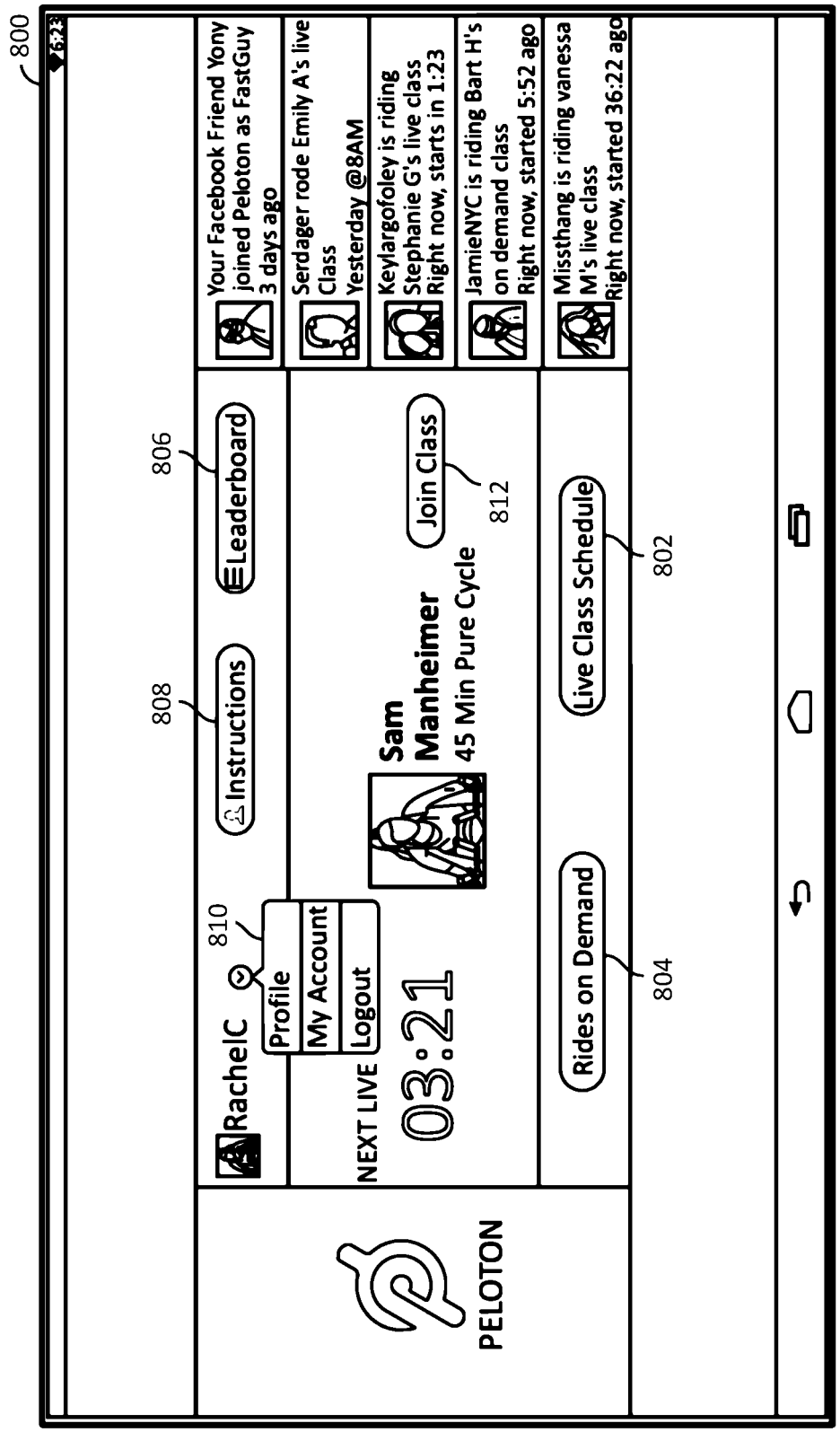
FIGS. 8A, 8B and 8C illustrate example user interface screens for an exercise apparatus in accordance with one or more embodiments of the present disclosure.
Figure 8B:
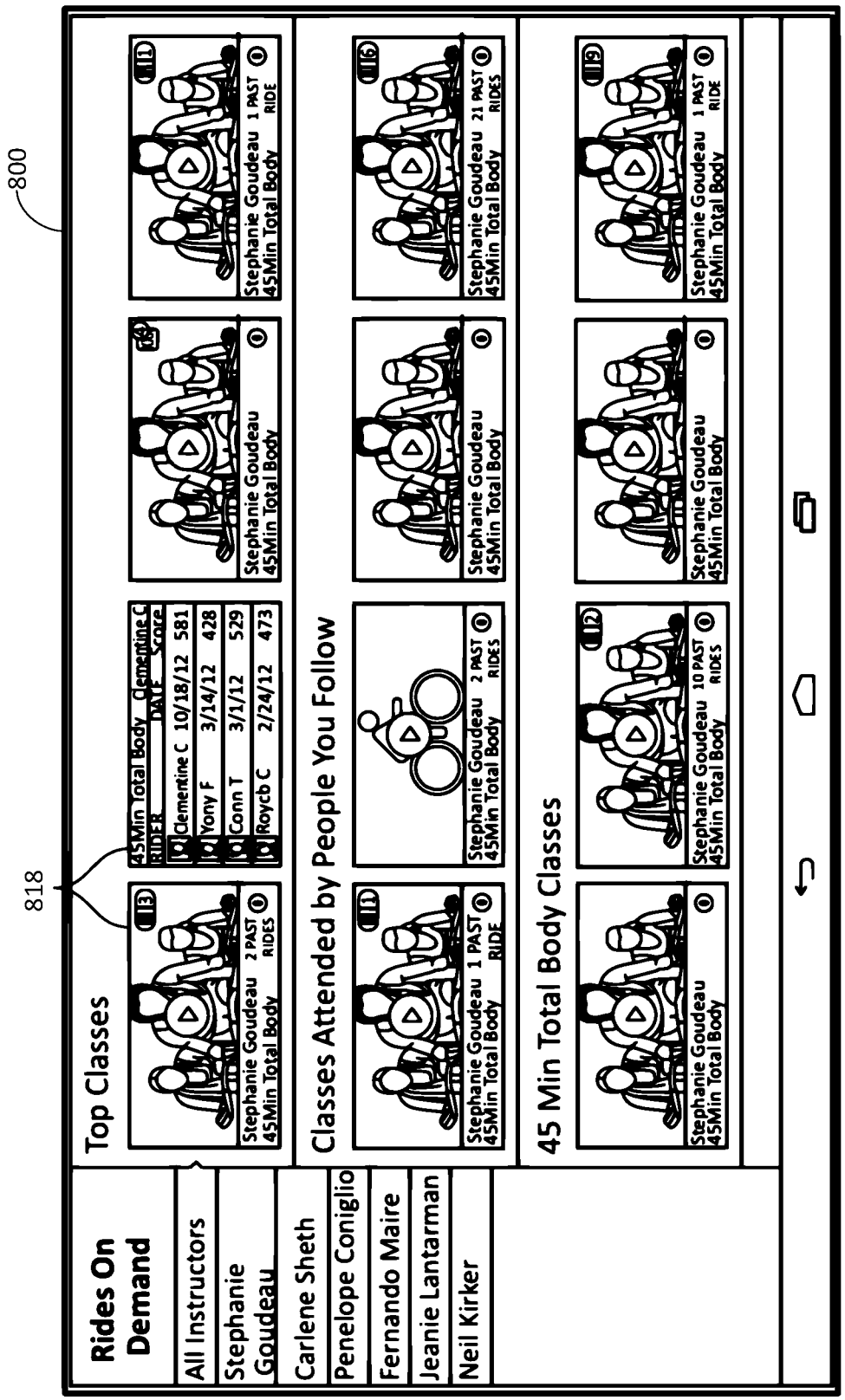
Figure 8C:
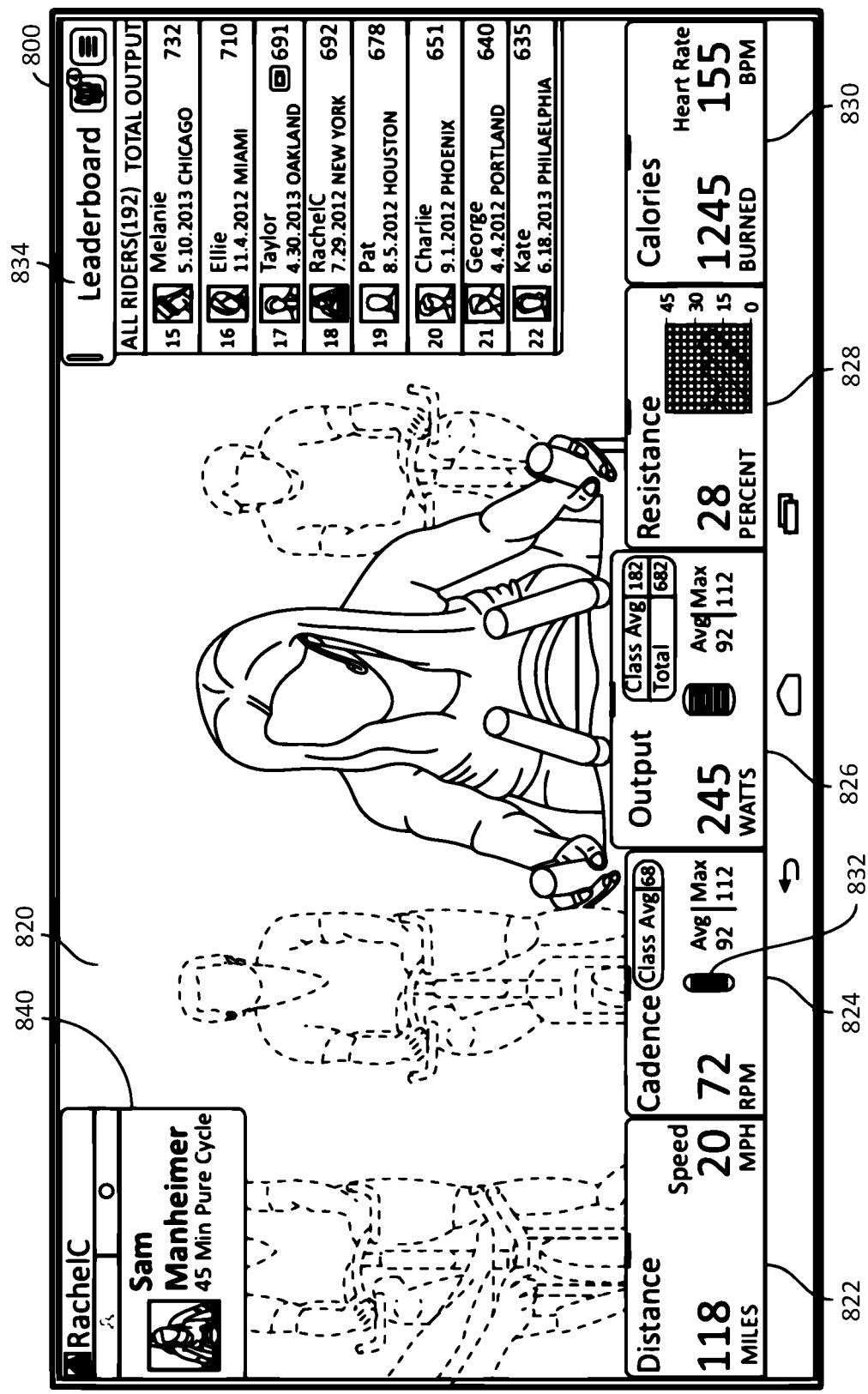

Referring to FIGS. 8A-8C, a user interface 800 may be presented on the display screen 704 to allow the user to manage their experience, including selecting information to be displayed and arranging how such information is displayed on their system. The user interface may present multiple types of information overlaid such that different types of information can be selected or deselected easily by the user. For example, performance information may be displayed over video content using translucent or partially transparent elements so the video behind the information elements can be seen together with the information itself.

The user interface 800 may present a variety of screens to the user, which the user can move among quickly using the provided user input device, including by touching if a touchscreen is used. In various example embodiments, the user interface may provide a home screen that provides basic information about the system and available options. Referring to FIG. 8A, such a home screen may provide direct links to information such as scheduled classes 802, archived classes 804, a leaderboard 806, instructors 808, and/or profile and account information 810. The screen may also provide direct links to content such as a link to join a particular class 812. The user can navigate among the different screens in the user interface by selecting such links using the applicable input device such as by touching the touchscreen at the indicated location, or by swiping to bring on a new screen. The user interface may also provide other information relevant to the user such as social network information, and navigation buttons that allow the user to move quickly among the different screens in the user interface.

In various example embodiments, the user can select among both live and archived content. For example, if the user selects scheduled classes 802, they may be presented with a screen showing the schedule of upcoming classes. The user interface allows users to select classes by time, instructor or rides type and/to start a class that is underway or about to begin. The class schedule may be presented in any suitable format, including calendar, list, or any other appropriate layout.

In various example embodiments, if the user selects archived classes 804, they may be presented with a screen showing available archived classes sorted by any appropriate category. FIG. 8B shows an example display of archived classes. Thumbnails or icons 818 representing archived classes may be displayed in any suitable format and may include information on how many times the user has ridden that class in the past or other performance or class-related information. A class may be accessed by selecting a particular thumbnail or icon.

Referring to FIG. 8C, when a class is being playing on the display screen through the user interface 800, in various example embodiments the primary video feed may be shown as the background video full-screen or in a sub-window on the screen. Information elements may be provided on different parts of the display screen to indicate any performance metrics, including time ridden, elapsed time, time left, distance, speed, resistance, power, total work, pedal cadence, heart rate, respiration, hydration, calorie burn, and/or any custom performance scores that may be developed. The displayed information may also include the trend or relationship between different performance metrics. For example, the display can indicate a particular metric in a color that indicates current performance compared to average performance for a class or over time, such as red to indicate that current performance is below average or green to indicate above average performance. Trends or relative performance can also be shown using color and graphics, such as a red down arrow to show that current performance is below average.

A primary window 820 showing the live or archived class that the user selected. In various example embodiments, performance metric windows 822, 824, 826, 828, and 830 may show specific performance metrics for the user's current ride, past rides, or other performance information. Such performance metric windows may be presented anywhere on the display screen and may be user selectable such that they can be displayed or removed by a screen touch or gesture. As shown in FIG. 8C, window 822 displays distance and speed. Window 824 displays current pedal cadence, along with the user's average and maximum cadence and the class average, and an indicator arrow 832 showing whether the user's cadence is increasing or decreasing. Window 826 shows power output in watts, together with average output, maximum output, class average, and total output, along with a similar indicator arrow. Window 828 shows resistance as both a number and graphically, and window 830 shows calories burned and heart rate.

The user interface may allow the user to toggle between display of maximum, average, and total results for different performance metrics. The user interface may also allow the user to hide or display information elements, including performance metrics, video streams, user information, etc. all at once or individually. Performance information can also be displayed in various display bars that can be hidden or displayed as a group or individually. The user interface may provide for complete controls for audio volume, inputs, and outputs as well as display output characteristics.

A leaderboard 834 may also be displayed to allow the user to see their performance in comparison to others taking the same class. In various example embodiments, a leaderboard may be configured to display the relative performance of all riders, or one or more subgroups of riders. For example, the user may be able to select a leaderboard that shows the performance of riders in a particular age group, male riders, female riders, male riders in a particular age group, riders in a particular geographic area, etc. Users may be provided with the ability to deselect the leaderboard entirely and remove it from the screen. In various example embodiments, the system may incorporate various social networking aspects such as allowing the user to follow other riders, or to create groups or circles of riders. User lists and information may be accessed, sorted, filtered, and used in a wide range of different ways. For example, other users can be sorted, grouped and/or classified based on any characteristic including personal information such as age, gender, weight, or based on performance such as current power output, speed, or a custom score.

The leaderboard 834 may be fully interactive, allowing the user to scroll up and down through the rider rankings, and to select a rider to access their detailed performance data, create a connection such as choosing to follow that rider, or establish direct communication such as through an audio and/or video connection. The leaderboard may also display the user's personal best performance in the same or a comparable class, to allow the user to compare their current performance to their previous personal best. The leaderboard may also highlight certain riders, such as those that the user follows, or provide other visual cues to indicate a connection or provide other information about a particular entry on the leaderboard. In various example embodiments, the leaderboard will also allow the user to view their position and performance information at all times while scrolling through the leaderboard.

In various example embodiments, the system calculates and displays one or more custom scores to describe one or more aspects of the users' performance. One example of such a custom score would be a decimal number calculated for a particular class or user session. Such a score could also be calculated using performance data from some or all classes or sessions over a particular period of time. In an example embodiment, the custom score takes into account the amount of time ridden, total work during that time period, and number of classes in a given time period.

In various example embodiments, performance information about other users may be presented on the leaderboard 834 or in any other format, including formats that can be sorted by relevant performance parameters. Users may elect whether or not to make their performance available to all users, select users, and/or instructors, or to maintain it as private so that no one else can view it.

In various example embodiments the user interface may also present one or more video streams from a range of different sources. For example, one video stream may be the live or archived class content shown in the primary window, while one or more additional video streams may be displayed in other windows on the screen display 704. The various video streams may include live or recorded streaming instructor video or any other video content, including one or more live video chat streams.

The user interface may also provide additional windows that can be used to display a range of content including additional performance data, information about the class, instructor, other riders, etc., or secondary video streams. Such additional windows can allow the user to see a range of information regarding other current or past participants to compare performance, and open or close voice or video chat streams or other communication channels. In various example embodiments the user can simultaneously access other content including movies, television channels, online channels, etc. A secondary window 840 may display a range of information and content. In the illustrated embodiment, secondary window 840 displays the name of the user, the name of the current class and basic class information, but other information may be displayed, such as information displayed in windows 822, 824, 826, 828 and 830.

In various example embodiments, the system can provide for simultaneous participation by multiple users in a recorded class, synchronized by the system and allowing access to all of the same communication and data sharing features that are available for a live class. With such a feature, the riders simultaneously participating in the same archived class can compete against each other, as well as against past performances or "ghost" riders for the same class.

Figure 9:
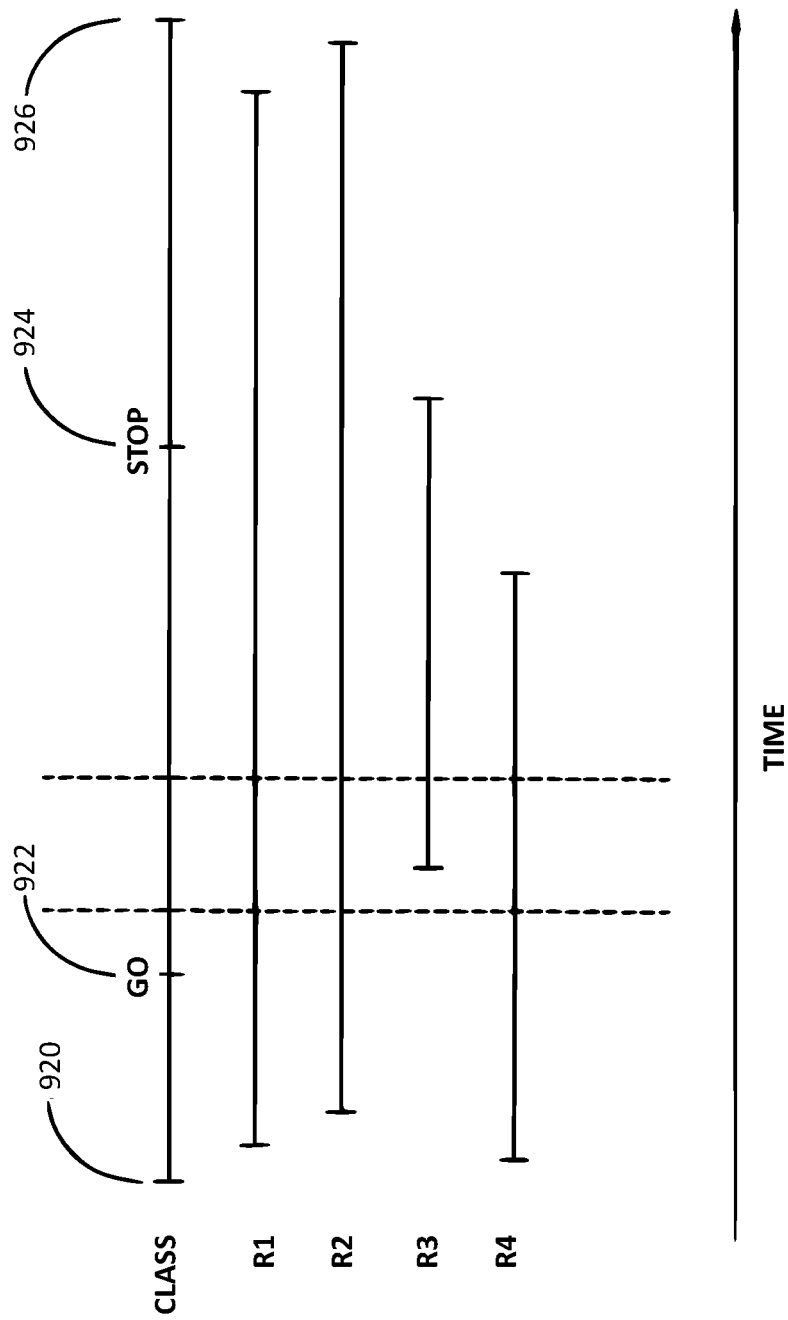
FIG. 9 is a chart showing an example method for synchronizing data among users participating in the same live or on-demand cycling class, in accordance with an embodiment of the present disclosure.

FIG. 9 shows various events relative to time, which is increasing from left to right on the scale at the bottom. The timeline for the class itself, whether live or archived, is shown at the top, with timelines for four different riders below it. The video being delivered for a live or archived class may begin before the actual class starts at the video start point 920. The GO signal point 922 indicates the start of the class or the class's comparison period, the STOP signal point 924 indicates the end of the class or the end of the class's comparison period, and the end video point 926 indicates the end of the video stream. For Riders 1, 2, and 4, who all start riding before the GO signal point, the GO signal serves as their starting time point for class performance metrics. For Rider 3, the point in time when they actually start will serve as their starting time point for class performance metrics. For Riders 1, 2, and 3 who continued past the STOP signal point, their end point for class performance metrics will be the STOP signal point, while the end point for Rider 4 will be the time when they actually stopped riding.

Using such a system, live and past performance (ghost bike) data for the user or other participants, such as leaderboard content, can be provided during a class in a range of numerical and graphical formats for comparison and competition. Live and past performance data or target performance data for the user can also be displayed simultaneously to allow users to compare their performance to a benchmark in real time during or after a class. In various example embodiments, the system may also allow users to establish handicapping systems to equalize the competition among different users or user groups allowing for broad based competitions.

Figure 10:
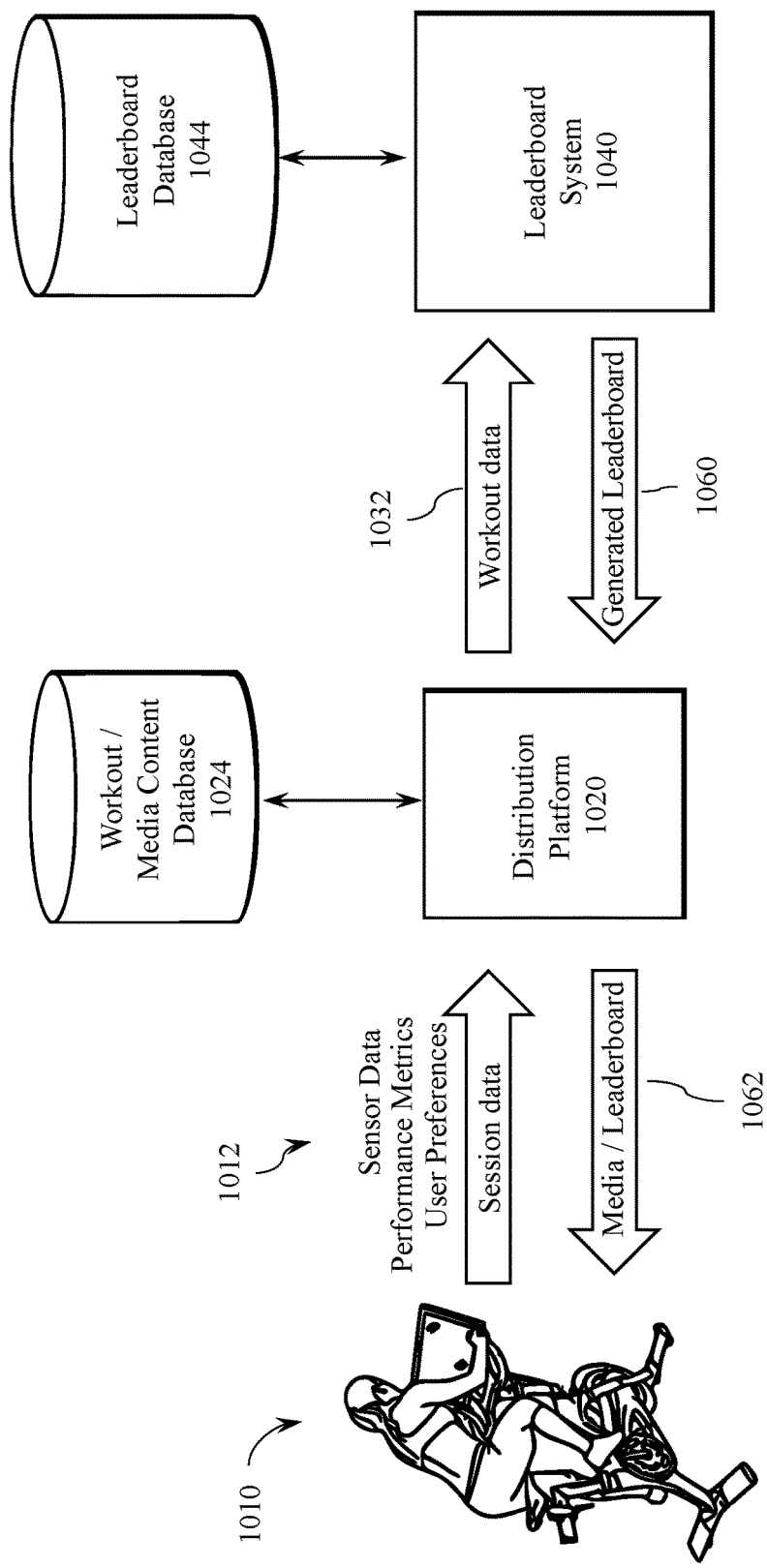
FIG. 10 is an example computing environment for distribution of computer generated media content, in accordance with an embodiment of the present disclosure.

Referring to FIG. 10, a local system 1010 includes a user operating an exercise apparatus that includes one or more sensors, a processing system that generates one or more performance metrics and a display for displaying leaderboard information. During an exercise class, the local system 1010 transmits session data 1012 to the distribution platform 1020. In various embodiments, the session data 1012 may include sensor data (e.g., resistance, cadence, user heartrate), performance metrics (e.g., speed, distance, position on leaderboard), and/or user preference information (e.g., favorite music, workout preferences). The distribution platform 1020 serves media 1062 associated with the exercise class (e.g., video, audio and other workout content from a workout/media content database 1024, and leaderboard information from a leaderboard system 1040) to the local system 1010.

The distribution platform 1020 and/or the local system 1010 provides workout data 1032 to a leaderboard system 1040 that is configured to compile, compress and store workout data in a leaderboard database 1044 (e.g., cloud storage, networked storage, etc.). The leaderboard system 1040 is also configured to retrieve and decompress stored leaderboard data and generate a leaderboard 1060 for display to the user of the local system 1010.

Hardware and software within the sensors or in a separate processing system may be provided to calculate and store a wide range of status and performance information. Relevant performance metrics that may be measured or calculated include resistance, distance, speed, power, total work, pedal cadence, heart rate, respiration, hydration, calorie bum, and/or any custom performance scores that may be developed. Where appropriate, such performance metrics can be calculated as current/instantaneous values, maximum, minimum, average, or total over time, or using any other statistical analysis. Trends can also be determined, stored, and displayed to the user, the instructor, and/or other users. A user interface may be provided for the user to control the language, units, and other characteristics for the information displayed.

In various embodiments, compression of sensor data, user data, ride data and/or other associated data stored and retrieved during operation of the system may be implemented using the approaches previously discussed and/or one or more alternative approaches to meet desired data loss and/or storage efficiency goals.

In the embodiment illustrated in FIG. 11A, a compression and retrieval process 1100 may be used for ride data that includes a set of fixed points or intervals. In step 1110, for each ride the average user output may be determined between fixed points and/or in another window/segment associated with each fixed point (e.g., a window surrounding the fixed point). The number of fixed point values may be further reduced, for example, using a line simplification algorithm. The resulting output may then be normalized in step 1112, for example, from 0 to 1. The compressed data may be retrieved in step 1114 to calculate the user's output at one or more times t by retrieving the normalized output at time t and multiplying by the user's final output. In this approach, every compressed workout would have the same point indices, which would lead to more efficient data storage. One tradeoff with this approach is greater error in the derived values.

In one embodiment, the fixed points are determined through a machine learning algorithm, which may include regression analysis of the data to determine the most significant points during the ride. In some embodiments, the machine learning approach may be used to determines a formula or curve for the ride data.

In another approach, illustrated in FIG. 11B, a signal compression and retrieval process 1150 may be implemented using a fast Fourier transform (FFT). Under this approach, the original signal is convoluted in step 1160 using the fast Fourier transform and, in step 1162, the beginning and end of the convoluted dataset is saved. In step 1164, the starting and ending points of the signal are also saved. Recovery is performed in step 1166 by creating a base saw-tooth shaped signal based on two points and then convoluting it. In step 1168, the left and right sides of the convoluted signal are replaced with the saved compressed data. The signal is then deconvoluted (e.g., inverse FFT) in step 1170, which will recover the original signal with a good approximation.

Advantages of the present embodiment will be apparent to those skilled in the art, including that the present embodiment can effectively achieve the reduction of user action and shorten the sensing time.

Figure 11C:
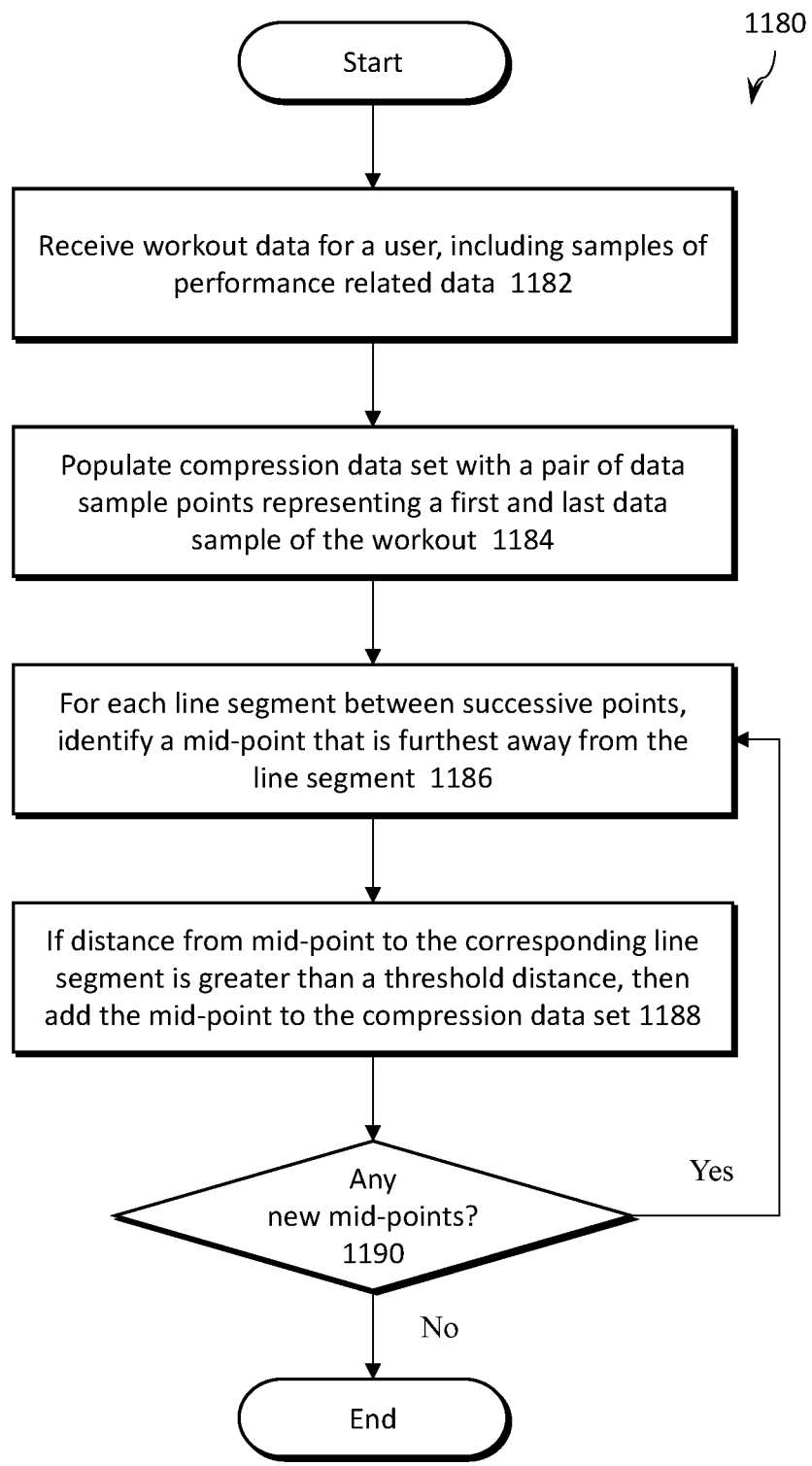

In the embodiment illustrated in FIG. 11C, an example compression process 1180 recursively samples workout data to generate a compressed dataset. In step 1182, the leaderboard system receives workout data for one or more users, including samples taken during the workout of performance-related data. For example, the data samples may include a workout time-stamp and sensed and/or calculated performance parameters such as distance traveled, speed, cadence, resistance, and/or other related data. In some embodiments, the leaderboard compression is performed using a lossy compression algorithm, such as the Ramer-Douglas-Peucker algorithm ("Douglas-Peucker algorithm"), to sample key points from each user's workout.

In some embodiments, the compression algorithm starts by identifying a first data point and last data point of the workout in step 1184, and then recursively adds midpoints between consecutive data points until an ending condition is met. In the illustrated embodiments, for each line segment between successive points, the leaderboard system identifies a mid-point that is furthest away from the line segment, in step 1186. In step 1188, if the distance from the mid-point to the corresponding line segment is greater than a predetermine threshold distance, then the mid-point is added to the compression data set. Otherwise, the mid-point is discarded without the simplified curve being worse than the threshold. The algorithm then recursively calls itself with each line segment between the points until no new points are added (step 1190). When recursion is complete, a new data set defining the workout is generated including the points that have been marked as kept and stored in a leaderboard storage.

In some embodiments, the leaderboard system is configured to generate two or more compressed sets of data for a workout to track different performance parameters. For example, the first dataset may include times for each class participant, and the second dataset may include one or more data outputs (e.g., sensed or calculated performance parameters) corresponding to those times. Both lists may be stored (e.g., in plain text, in a database, etc.) in a file that includes a workout identifier and compressed data including associated times and outputs.

In one example, a method for distributing leaderboard information to live and archived exercise classes comprises providing information about available live classes and information about available archived classes that can be accessed by a user of an exercise apparatus at a first location, receiving a selection of either a live exercise class or an archived exercise class, retrieving leaderboard data for the selected exercise class if available, decompressing the retrieved leaderboard data, and providing digital video and audio content comprising the selected exercise class to the first exercise apparatus at the first location. The method may further comprise receiving an indication of a class end condition, gathering data from the selected exercise class from one or more class participants, compressing the gathered data, and appending the compressed gathered data to the stored leaderboard data for the class. The leaderboard data may be compressed using a Ramer-Douglas-Peucker algorithm to sample data points for each user in the gathered data, and the compressed data may be stored in a folder for an exercise class, wherein each folder includes at least one folder identifying compressed data for a session of the exercise class.

In various embodiments, determining one or more performance parameters for the first user at the first location further comprises sensing at least one performance parameter from a first exercise apparatus operable by the first user at the first location. The display screen at the first location may further comprise a graphical user interface with user selectable content for display during the selected exercise class, and dynamically displaying one or more performance parameters for the second user at the second location on the display screen at the first location may further comprise displaying the first user performance parameters and second user performance parameters in a secondary window.

The digital video and audio content, first user performance parameters and second user performance parameters may be output substantially in real-time. The method may further comprise requesting the digital video content, audio content and class participant content associated with the selected exercise class from a server through the digital communications network, wherein the class participant content comprises content associated with the second user. The method may further comprise generating a leaderboard from the class participant content and the plurality of first user performance parameters, the leaderboard representing performance parameters at the same point in the selected exercise class and displaying the leaderboard at the first location. The class participant content may comprise live and archived class participant content, and the leaderboard is synchronized to the first user's performance parameters allowing for comparative class participant content to be presented to the first user.

The foregoing disclosure is not intended to limit the present invention to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize advantages over conventional approaches and that changes may be made in form and detail without departing from the scope of the present disclosure. Thus, the present disclosure is limited only by the claims.

The invention claimed is:

1. A method comprising:
 delivering data identifying available live and/or archived exercise classes accessible to a first exercise apparatus at a first location;
 receiving a selection of an available exercise class from the first exercise apparatus;
 retrieving compressed leaderboard data for the selected exercise class comprising performance data for prior class participants; and
 delivering exercise class content to the first exercise apparatus at the first location, including streaming video content and leaderboard data associated with the selected available exercise class for display to the user in real-time during the exercise class;
 wherein streaming the leaderboard data comprises decompressing a subset of the compressed leaderboard data for a selected plurality of the prior class participants corresponding with a timestamp of the streamed video content, and transmitting the decompressed leaderboard data to the first exercise apparatus at the first location for display with the corresponding video content.

2. The method of claim 1, further comprising:
 receiving an indication of a class end condition;
 gathering data from the selected exercise class from one or more class participants, including data associated with the first exercise apparatus;
 compressing the gathered data; and
 appending the compressed gathered data to stored leaderboard data for the selected exercise class.

3. The method of claim 2, wherein compressing the gathered data comprises implementing a Ramer-Douglas-Peucker algorithm to sample data points for each user in the gathered data.

4. The method of claim 2, wherein compressing the gathered data comprises:
 sampling a plurality of points from each user's workout comprising identifying a first point and a last point of the workout and at least one mid-point of the workout;
 wherein identifying at least one mid-point comprises, for each successive pair of sampled points, identifying a mid-point that is furthest away from a line segment between the pair of sampled points, and adding the mid-point to the plurality of points if a distance between the mid-point and the line segment is greater than a predetermined threshold.

5. The method of claim 4, wherein sampling a plurality of points further comprises a recursive process that recursively calls itself with each line segment between each pair of consecutive points until no new mid-points are above a threshold distance from a corresponding line segment.

6. The method of claim 2, wherein the compressed data is stored in a folder structure associated with the exercise class, comprising a plurality of folders and at least one folder identifies compressed data for a session of the exercise class.

7. The method of claim 1, further comprising:
displaying at the first location a user interface with user selectable content for display during the selected exercise class, including dynamically displaying one or more performance parameters for a second user at a second location on the display screen at the first location; and
displaying the performance parameters for the first user and the second user in a secondary window;
wherein exercise class content comprises digital video and/or audio content, and the performance parameters for the first user and the second user; and
wherein the exercise class content is displayed in real-time.

8. The method of claim 1, further comprising receiving a request for exercise content, including audio content and class participant content associated with the selected exercise class at a server through a communications network.

9. The method of claim 8, wherein the class participant content comprises content associated with a second user.

10. The method of claim 1 further comprising generating a leaderboard from the exercise class content and sensed performance parameters of the first user, the leaderboard representing other participant performance parameters at the same point in the selected exercise class; and displaying the leaderboard at the first location;
wherein the exercise class content comprises live and/or archived exercise class content, and the leaderboard is synchronized to the first user's performance parameters allowing for comparative class participant content to be presented to the first user.

11. A system comprising:
a data distribution server system comprising a first processor configured to:
deliver data identifying available live classes and/or archived classes to a user of a first exercise apparatus at a first remote location; and
receive a selection of an available exercise class; and
deliver exercise class content to the first exercise apparatus at the first location, including streaming video content and leaderboard data associated with the selected available exercise class for display to the user in real-time during the exercise class;
a leaderboard generation system comprising a second processor configured to:
receive a request from the distribution system for leaderboard data comprising performance data for prior class participants for the selected exercise class, the leaderboard data being stored in a compressed format;
identify a subset of the compressed leaderboard data for a selected plurality of the prior class participants corresponding with a timestamp of the streamed video content;
decompress the identified subset of the compressed leaderboard data; and
deliver the decompressed leaderboard data to the distribution system for transmission to the first exercise apparatus with the corresponding video content.

12. The system of claim 11, wherein the distribution system is further configured to:
receive an indication of a class end condition;
gather data from the selected exercise class from one or more class participants, including data associated with the first exercise apparatus; and
transmit the data to the leaderboard system.

13. The system of claim 12, wherein the leaderboard system is further configured to:
compress the gathered data; and
append the compressed gathered data to stored leaderboard data for the selected exercise class.

14. The system of claim 13, wherein the leaderboard system is further configured to compress the gathered data by implementing a Ramer-Douglas-Peucker algorithm to sample data points for each user in the gathered data.

15. The system of claim 14, wherein the leaderboard system comprises a storage system configured to store the compressed leaderboard data.

16. The system of claim 15, wherein the compressed leaderboard data is stored in a folder structure associated with the exercise class.

17. The system of claim 16, wherein the folder structure comprises a plurality of folders and at least one folder identifies compressed data for a session of the exercise class.

18. The system of claim 16, wherein the exercise apparatus is configured to:
sense a performance parameter associated with a first user of the first exercise apparatus at the first location;
display at the first location a user interface with user selectable content for display during the selected exercise class;
dynamically display one or more performance parameters for a second user at a second location on the display screen at the first location; and
display the first user performance parameters and second user performance parameters in a secondary window.

19. The system of claim 16, wherein exercise content includes digital video and/or audio content, and performance parameters for a first user and a second user; and
wherein the distribution system is further configured to receive a request for the digital video content, audio content and class participant content associated with the selected exercise class through a communications network.

20. The system of claim 18, wherein the exercise apparatus is further configured to:
generate a leaderboard from class participant content associated with the selected exercise class and performance parameters for the first user and the second user, the leaderboard representing performance parameters at the same point in the selected exercise class; and
display the leaderboard at the first location; and wherein the leaderboard is synchronized to the first user's performance parameters allowing for comparative class participant content to be presented to the first user.

* * * * *

UNITED STATES PATENT AND TRADEMARK OFFICE
CERTIFICATE OF CORRECTION

| | |
|---|---|
| PATENT NO. | : 12,023,548 B2 |
| APPLICATION NO. | : 17/543704 |
| DATED | : July 2, 2024 |
| INVENTOR(S) | : Keerthan Jaic et al. |

It is certified that error appears in the above-identified patent and that said Letters Patent is hereby corrected as shown below:

In the Specification

In the DETAILED DESCRIPTION:
Column 13, Line 54, change "calorie bum," to --calorie burn,--.

Signed and Sealed this
Third Day of September, 2024

Katherine Kelly Vidal
*Director of the United States Patent and Trademark Office*